United States Patent

[11] 3,627,956

[72] Inventors Klaus Gueldenpfennig; Gerhard O. K. Schneider, both of Rochester, N.Y.

[21] Appl. No. 886,577
[22] Filed Dec. 19, 1969
[45] Patented Dec. 14, 1971
[73] Assignee Stromberg-Carlson Corporation Rochester, N.Y.

[54] SEMIAUTOMATIC OPERATOR-CONTROLLED TELEPHONE SYSTEM

19 Claims, 9 Drawing Figs.

[52] U.S. Cl. .......... 179/27 CA
[51] Int. Cl. .......... H04m 3/60
[50] Field of Search .......... 179/27 CA, 27 D, 27 F

[56] References Cited

UNITED STATES PATENTS

| | | | |
|---|---|---|---|
| 3,377,434 | 4/1968 | Banks et al. .......... | 179/27 CA |

*Primary Examiner*—Kathleen H. Claffy
*Assistant Examiner*—Thomas W. Brown
*Attorney*—Charles C. Krawczyk

ABSTRACT: A semiautomatic operator-controlled telephone system wherein any one of a plurality of operator consoles can be given access to the system control equipment for automatically setting up the connections between input circuits by merely sequentially actuating the switches designating the input circuits. Separate control circuits for each of the consoles are interconnected so that only one operator console can gain access to the control equipment at one time and the other operator consoles are inhibited. The control circuits are released after the connections between the operator and an input circuit are complete, or after a sufficient period of time to complete the connections.

KLAUS GUELDENPFENNIG
GERHARD O.K. SCHNEIDER
INVENTOR.

BY Charles C. Kraweggh
ATTORNEY

KLAUS GUELDENPFENNIG
GERHARD O.K. SCHNEIDER
INVENTOR.

BY Charles C. Krawczyk
ATTORNEY

KLAUS GUELDENPFENNIG
GERHARD O. K. SCHNEIDER
INVENTOR.

BY Charles C. Krawczyk

ATTORNEY

KLAUS GUELDENPFENNIG
GERHARD O. K. SCHNEIDER
INVENTOR.

BY Charles C. Krawczyk

ATTORNEY

KLAUS GUELDENPFENNIG
GERHARD O.K. SCHNEIDER
INVENTOR.

BY Charles C. Krawczyk
ATTORNEY

KLAUS GUELDENPFENNIG
GERHARD O. K. SCHNEIDER
INVENTOR.

BY Charles C. Krawczyk

ATTORNEY

INVENTOR.
KLAUS GUELDENPFENNIG
GERHARD O.K. SCHNEIDER
BY
Charles C. Krawczyk
ATTORNEY

SEMIAUTOMATIC OPERATOR-CONTROLLED TELEPHONE SYSTEM

BACKGROUND OF THE INVENTION

Often there are requirements for telephone systems wherein all connections are required to be made under the control of operators. The telephone system can, for example, be a private branch exchange (PBX) wherein the operator controls the connections to be made between various lines and/or between lines or trunks, or can function as a multipurpose tandem exchange wherein the operator can control (in addition to the foregoing) connections between trucks, between various computer interfaces, between any of the above-mentioned combinations and auxiliary communications systems, such as for example, radio communications systems. There is also a need for a telephone system that can function as a semiautomatic operator control patch field for providing connections between central offices which can be made quickly, in the event of usually high traffic conditions.

The number of operators necessary to control telephone systems of this type are dependent upon the amount of traffic being controlled by the system. Under high-traffic conditions wherein a large number of connections and disconnections are required to be made, it is desirable to have as many operators as possible available to make these connections. On the other hand, during periods of low-traffic requirements, it is desirable to reduce the number of operators on duty to as few as possible, preferably one. In order to simply add operators to the system as the traffic conditions dictate, it is required that each operator console has control overall of the input and output lines, and trunks, etc., so that a single operator can function to set up all the required connections under low-traffic conditions and that all operators are available to use for all call requests under high-traffic conditions. With such an arrangement, it is desirable that the operator can carry out its function as simply and quickly as possible. It is preferable that the operator makes the required connections by simply depressing a control pushbutton (in response to a visual signal) to provide the desired connect and disconnect functions. With the plurality of operators available for use on all lines, trunks, etc., provisions are required in this type of system to assure that only one operator will acquire control over a request for a connection, even through more than one operator simultaneously actuates the switch (on the separate consoles) that correspond to the same call request.

In the case of telephone calls in the usual sense wherein one party is calling another party via line and/or trunk connections, it is desirable that the telephone system includes provisions wherein the operator can have control of setting up and disconnecting the circuits or, alternatively the operator can have control in setting up the circuits function as both, a tandem and the circuits can be disconnected automatically upon completion of the calls. However, in the case wherein the telephone system is to be used as a tandem switching exchange or as a patch field between control offices, it is desirable that the operator be given sole control of the setup and disconnect connections. In the event the telephone system is required to function as both, a tandem switching exchange and a private branch exchange, it is desirable that the setup and disconnect be under the sole control of the operator in areas such as interconnections between computer interfaces, trunk-to-trunk connections and connections to auxiliary communications systems, and in the case of connection between calling parties in the usual sense, allowing disconnect functions to be under the control of the party, if desirable.

It is, therefore, an object of this invention to provide a new and improved semiautomatic operator-controlled telephone system.

It is also an object of this invention to provide new and improved semiautomatic operator-controlled telephone system wherein the connect and disconnect functions are under the control of an operator.

It is still a further object of this invention to provide new and improved semiautomatic telephone system wherein the connections through the telephone system can be made by any one of a plurality of operator positions.

It is also an object of this invention to provide a new and improved semiautomatic telephone system wherein a plurality of operator positions are available to complete any of the connections in the telephone systems and includes provisions for assuring that only one operator gains control for the setup of a call at one time.

It is also an object of this invention to provide a new and improved semiautomatic telephone system wherein a plurality of operator consoles are available to complete any of the connections in the telephone system including provisions for assuring that only one operator gains control for connecting a call at one time and for storing other system access requests by other operators during the connection time.

It is still a further object of this invention to provide a new and improved semiautomatic operator-controlled telephone system that can function as a tandem exchange.

It is also an object of this invention to provide a new and improved semiautomatic operator patch field.

It is also an object of this invention to provide a new and improved semiautomatic operator control telephone switching system wherein communication links can be established and disconnected between a large variety of communication medias under the control of an operator.

BRIEF DESCRIPTION OF THE INVENTION

A semiautomatic operator-controlled telephone system for interconnecting a plurality of input circuits through a switching network. A plurality of operator consoles includes control switches to gain access to the system control equipment to make connections between the operator console and the input circuits. A separate control switch is provided for each input circuit. An operator access circuit, in response to the actuation of a control switch, accesses the control equipment to an operator console for a sufficient period of time to connect the operator console to the selected input circuit. A logic circuit in the operator access circuit assures that only one operator console can gain access to the control equipment at one time. Once the operator completes the connections between input circuits, circuit means are provided for disconnecting the operator console.

A further feature of the invention allows the connection between the input circuits to be disconnected by the parties connected to the input circuits, or wholly under the control of the operator by requiring the operator to be reconnected to the switching network to be able to disconnect the circuit, or any combination thereof depending upon the particular system used.

The telephone switching system of the invention can function as a private branch exchange (PBX), a tandem switch or as an automatic patch field.

A further feature of the invention allows other operator system access requests to be stored while the control equipment is setting up a call so that a control switch need only be actuated once. When the connection in progress is completed, or time alloted to completing the connection has elapsed, the stored requests will be recognized and the corresponding operator console will be accessed to the system control equipment.

DESCRIPTION OF THE PREFERRED EMBODIMENT

Figure 1:
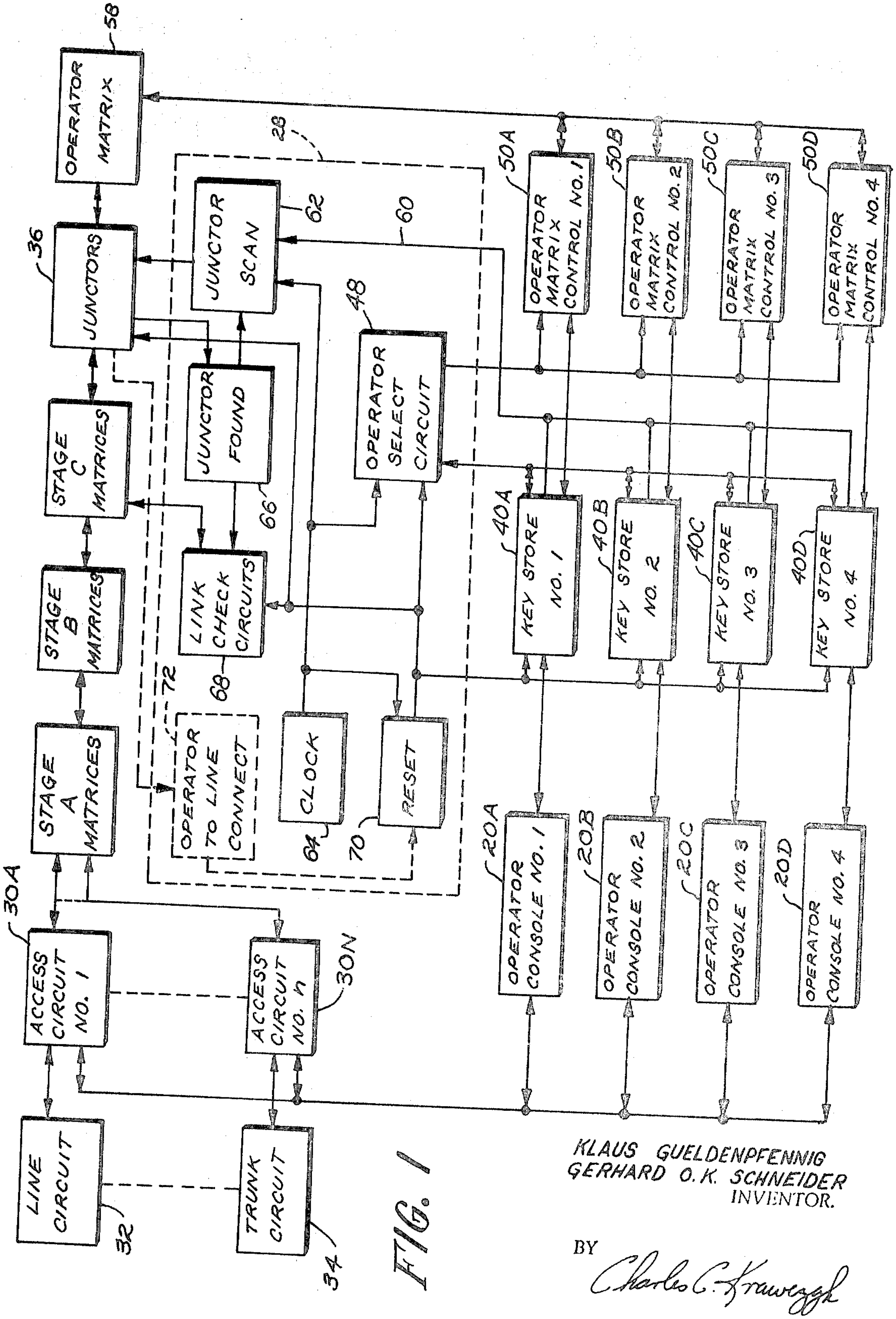
FIG. 1 is a simplified block diagram of a telephone switching system including the invention.

The semiautomatic operator-attended telephone system disclosed in FIG. 1 includes four pushbutton-type operator consoles 20A–20D. The consoles 20A–20D provide access to the system control equipment (enclosed within the dashed block 28) to each operator. Each of the operator consoles 20A–20D is individually connected to each one of a plurality of access circuits 30A–30N. These access circuits 30A–30N function as interface circuits between individual line circuits 32, and/or individual trunk circuits 34 and a stage A matrix of the system switching network. Each line circuit and trunk circuit is connected to a separate access circuit. Although the access circuit 30A–30N are illustrated as connected to line and trunk circuits, it is to be understood that the access circuit can also be connected to a variety of other communication medias, such as for example, AM and FM radio transmission systems, and also to computer interfaces.

The switching network is a three stage (A, B and C) nonblocking switching system. Each stage includes a plurality of matrix modules that are interconnected in a manner so as to provide connections between each of the access circuits 30A–30N and each of a plurality of junctor circuits 36. For purpose of illustration, the switching network will be described as providing 200 possible connections between 200 access circuits 30A–30N at one end of the A stage matrices, and 48 junctors (96 ports) at the C stage matrix. In such an arrangement, there can, for example, be 25 matrix modules in stage A, each including eight link connections to eight separate access circuits, and 15 link connections to the stage B matrices. Stage B, in such case, can have 15 matrix modules, each having 25 link connections available to the A stage matrix modules and 12 link connections available to each of the stage C matrix modules. Stage C in such arrangement can include 12 matrix modules wherein each of the modules can be seized from any one of 15 link connections in the stage B matrix. The juncture circuits 36 consist of 12 groups of junctors of four junctors in each, with each group connected to separate ones of the 12 matrix modules in stage C. However, it is to be understood, that the number of junctors, the number of matrix stages in the network, the number of matrix modules in each stage, and the number of cross-points in each module, can vary as determined by the size, complexity and traffic requirements of the system, and that the principles set forth and described herein will apply to larger and smaller networks by the extension of the principles set forth herein. For further information respecting the interconnection of matrices in the manner described above, reference may be made to an article entitled "A Study of Non-Blocking Switching Networks" by C. Clos which appeared in the "Bell System Technical Journal," March 1953, Pages 406–424.

Each of the operator consoles 20A–20D is coupled through separate key store circuits 40A–40D to the operator select circuit 48. The operator select circuit 48 provides a means by which the operator consoles 20A–20D are given access to the control equipment 28, to allow operation in a manner that eliminates the possibility of two or more operators gaining access to the same equipment at the same time. The key store circuits 40A–40D are also connected through the operator matrix control circuit 50A–50D to the operator matrix 58. The operator select circuit 48 is also connected to the matrix control circuits 50A–50D. The operator matrix 58 provides for the interconnection of the operator consoles 20A–20D and the junctor circuits 36.

The control equipment 28 includes a junctor scan circuit 62 responsive to an enabled signal from the key store circuits 40A–40D (line 60) and responsive to pulse from a clock circuit 64 to sequentially scan the junctor circuits 36 for a free junctor. A junctor found circuit 66 monitors the scanned junctor circuits and detects the presence of a free junctor to stop the junctor scanner 62, and also applies an enable signal to one of 12 groups of link check circuits 68. A separate link check circuit is provided for each of the 12 junctor groups and the 12 matrix modules in the stage C matrix to allow scanning of the 15 individual links for each particular junctor group.

The junctor circuits 36 maintain the status functions (free—busy) in individual storage circuits since no central memory system is used in this system. A reset circuit is connected to each of the key store circuits 40A–40D and an operator select circuit 48 to release the control circuit 28 and the operator within a preset period of time more than sufficient to complete the connections. In addition, an operator-to-line connect circuit 72 can be connected between the junctor circuits 36 and reset circuit 70 to reset the switching system as soon as connection has been completed, thereby allowing for more efficient operation.

A calling party on the line circuit 32 or trunk circuit 34 or other communication media connected to the access circuit originates a flashing lamp on each of the four operator consoles 20A–20D. The first operator that answers the call by depressing the pushbutton corresponding to the flashing indicator operates its key store circuit to apply a signal to the operator select circuit 48. The operator select circuit responds to the signal from the key store enabling the particular operator console, and inhibiting the other three operator consoles from acting on the same call. The key store circuits 40 include means for storing any requests for access to the system control equipment during the period the consoles are inhibited so that a pushbutton for completing a call needs merely to be depressed once. A control signal is returned from the operator select circuit 48 to the key store circuit which extends ground through the depressed key in the operator console to mark the particular access circuit and at the same time allows the selected key store circuit to enable the junctor scanner 62. When a free junctor is located, the junctor found circuit stops the junctor scanner 62 and applies a junctor group enable signal to one of the 12 link check circuits corresponding to the junctor group seized. The link check circuit determines what link is free between the junctor and the marked access circuit and closes the corresponding mark lead through the stage A, B and C matrices. This allows the mark relays in each of the three matrix stages and junctor to be energized. The sleeve connections corresponding to the mark lead and the cross-points for the communications path are completed between the access circuit and the junctor at the same time mark and sleeve lead connections between the operator matrix and the junctor are completed. When the connection is established, a timeout signal from the reset circuit 70 resets the circuit involved.

The operator at this time receives the information concerning the called party. The connection between the calling parties, the operator and the access circuit of the called party are set up by depressing the corresponding access circuit pushbutton. When the called party answers, the operator depresses a release button so that the operator matrix is released. The connections can be automatically disconnected when the parties hang up, or of desired, the operator can be reconnected to the junctor and release the access circuits to disconnect the circuit. When the telephone system of the invention is used to provide connection between computer interfaces or to radio communication systems, or functions as a semiautomatic patch field between central offices, it is desirable that the operator has full control over both the setup and disconnect of the circuit.

Figure 2:
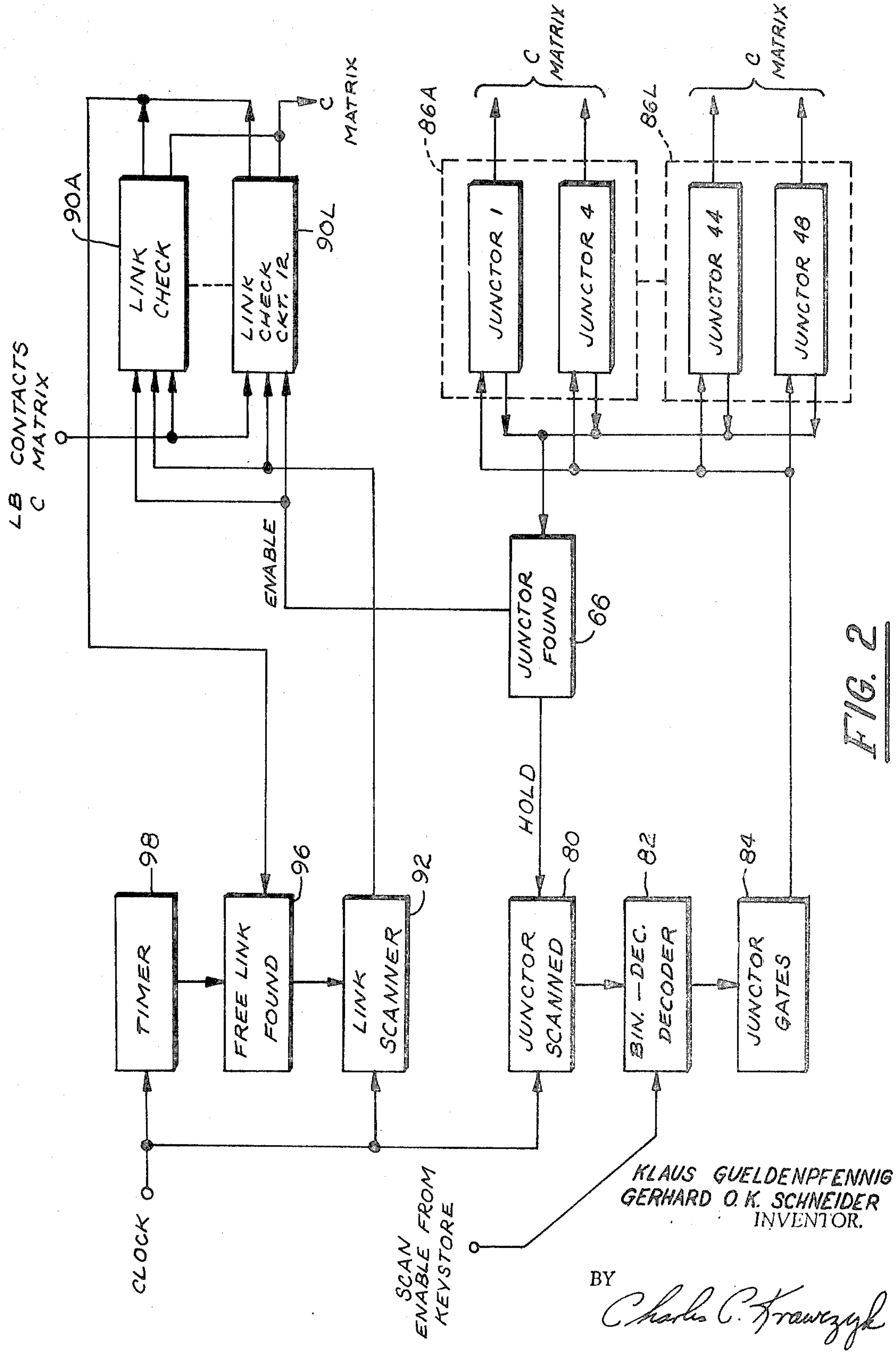
FIG. 2 is an expanded block diagram of the junctor scan circuit, the junctor circuits and the link check circuits of FIG. 1.
Figure 3:
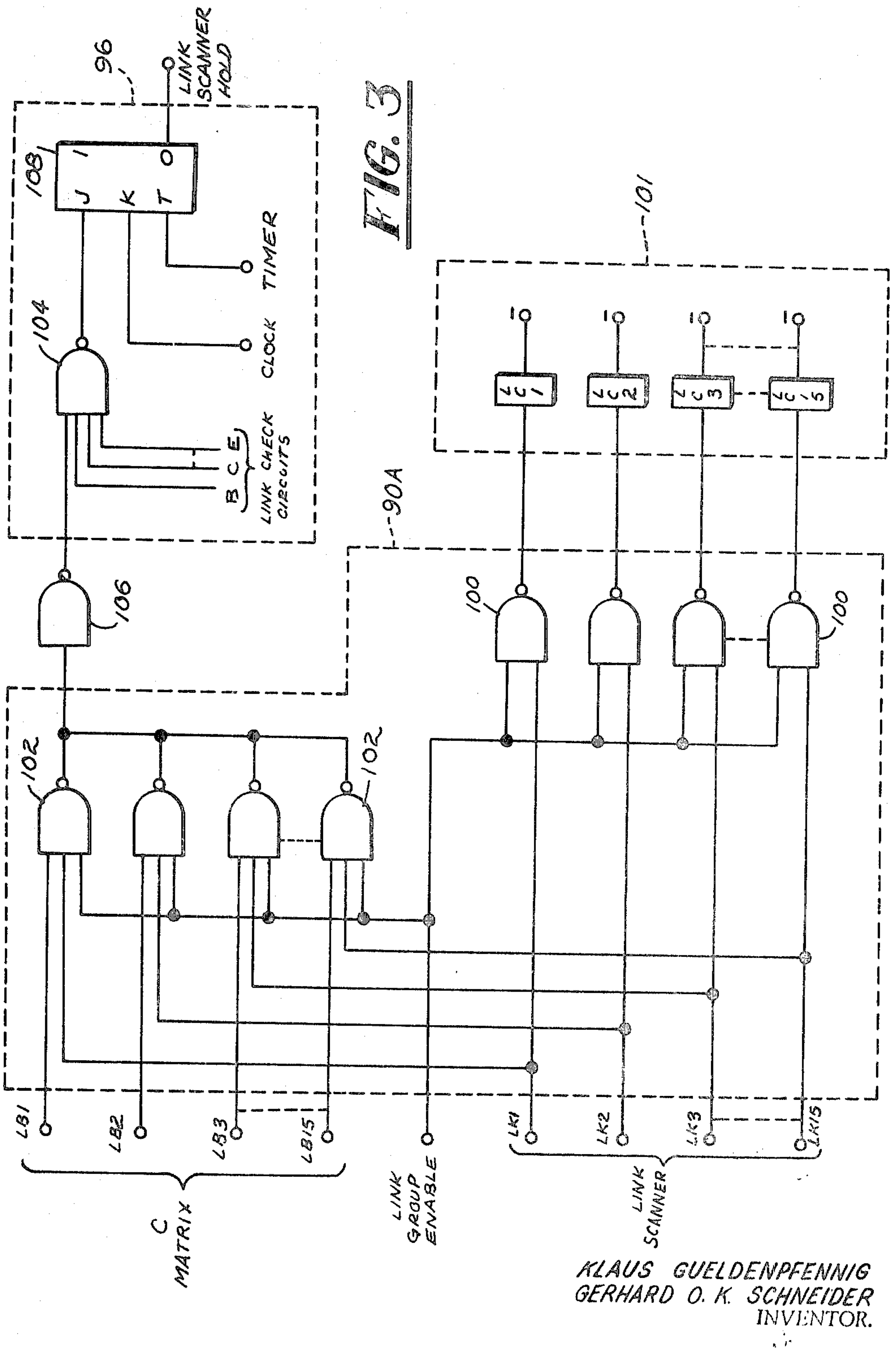
FIG. 3 is a schematic diagram of a portion of a link check circuit and a schematic diagram of a free link found circuit of FIG. 2.

The junctor and link scanning arrangement of the invention is further explained by reference to the drawings of FIGS. 2 and 3. A junctor scanner 80 comprises a binary counter circuit. The junctor scanner 80 is connected to apply pulses to a series binary-decimal decoder circuit 82 to generate a series of 48 sequential pulses (a separate pulse for each junctor pair). The sequential pulses are applied to the junctor gates 84 in response to a scan enable signal from a key store circuit to scan for a free junctor in the 12 junctor groups 86A–86L. Accordingly, the condition of each junctor pair is sequentially interrogated. When a free junctor is found, a signal is applied to the junctor found circuit 66 which applies a scan disable signal to the key store circuits and stops the junctor scanner 80 to allow the junctor mark relays to pick up, In addition, when a free junctor is found, the junctor found circuit 66 also applies a link check enable signal to one of the 12 link check circuits 90A–90L corresponding to the junctor group 86A–86L seized.

There are three types of inputs applied to the link check circuits 90A–90L: a scanning signal from the link scanner 92 that sequentially actuates the individual link check circuits in each group, a link check group enable signal from the junctor found circuit 66, and a link busy-free input signal from each of the links in the C stage matrix to separate link check circuits. The link scanner 92 continuously applies the sequential scanning pulses to individual link check circuits. When a link check group is selected and a free link in the selected group is located, a signal is applied to the free link found circuit 96 which, in turn, stops the scanner 92 for a preset period of time (controlled by a timer 98) of sufficient duration to allow the operator matrix to junctor connections to be completed and to complete the connections from the line access circuits 30A–30N to the selected junctor circuit 86A–86L.

With 15 matrix blocks in the stage B matrix, each of the 12 link check group 90A–90L will include 15 individual logic circuits for each link between the junctors in a junctor group 86A–86L and any of the line access circuits 30A–30L. Each link check group 90A–90L includes a first group of 15 junctor NAND-gates 100 commonly connected at one input to receive the link group enable signal from the junctor found circuit 66. The other input circuit of each of the NAND-gates 100 is individually connected to the link scanner 92 output terminals (LK1–LK2) to be sequentially enabled at the scanning rate (approximately 50 kHz. Each of the output circuits of the NAND-gates 100 are individually connected to separate link check relays LC1–LC15 in matrix C (designated by the dashed block 101). The contacts of the LC relays are connected in the mark leads in the C matrix (see FIG. 7). During a scan condition (while no free link found) the scan pulses applied to the NAND-gates 100 from the link scanner 92 are of a very short duration, wherein the link check relays are not energized for a sufficient period for the relays to operate.

Each link check group also includes a second group of NAND-gates 102 having one input circuit connected to the common link group enable line, and another input circuit individually connected to the link scanner 92 output terminal LK1–LK2 for sequentially receiving scanning pulses. The third input circuit of each of the NAND-gates 102 is separately connected to receive busy-free signals on the terminals LB1–LB15 connected to separate contacts LB (FIG. 7) for monitoring the condition of individual link circuits between the C matrix and the access circuits. The contacts LB are closed when either the C matrix mark relay (MKC) or the sleeve relay (SC) is energized.

When a free link is located (the corresponding LB contact is open) a high signal is applied to the corresponding terminal LB1–LB15. A high level developed by the connected gate 102 is inverted by gate 106 and applied to a NAND-gate 104 in the free link found circuit 96. The gate 104 now sets a scan hold flip-flop circuit 108 which applies a scan hold or disable signal to link scanner 92. The other 11 input circuits of the NAND-gate 104 (only four shown) are separately connected to corresponding logic circuits in the other link check groups 90B–90L. Accordingly, any of the link check groups (when selected) can set the flip-flop 108 when a free link is located in the selected group. The flip-flop 108 remains set until it receives a reset signal from the timer circuit 98.

When the link scanner 92 is in a hold condition, a continuous scan signal is applied to the NAND-gate 100 corresponding to the selected free link. The link scanner 92 is in a hold condition for a sufficient period of time (in order of 20 milliseconds) for the connected link relay (LC1–LC15) to pick up and for marking circuit through the network to be completed. For further information on the switching network (stages A, B and C) and the junctor scanner and link check circuits, reference may be made to a copending application entitled "Telephone Switching System," Ser. No. 782,078, filed by K. Gueldenpfennig on Dec. 9, 1968.

The access circuits 30A–30N are further explained by reference to the drawing of FIG. 4. The TT and TR leads are adapted to be connected to the tip and ring lines (T and R) of a line circuit, for example, of the type illustrated in FIG. 5. It is to be understood, of course, that the access circuit can also be connected to a wide variety of other circuits, such as for example, trunk circuits, computer interface circuits, interface circuits for radio communication systems, etc. The ST and SR leads are connected to the corresponding tip and ring connections in a stage A matrix module. The S and MK leads are connected to the sleeve and mark leads of the corresponding links of the stage A matrix module. A transformer 120 provides a coupling between the line circuit and the stage A matrix module. A gating arrangement including a PL relay and a pair of NAND-gates 122 and 123 is provided for signalling. The operation of the communication and the signalling path, including the transformer 120 and the gates 122 and 123, is fully explained in a copending application entitled "Low Level Signalling System for Telephone Networks," Ser. No. 773,071, filed for Frank Churnetski, Enrique Comas, and Klaus Gueldenpfennig on Nov. 4, 1968.

In a case of an incoming call, the CB relay of the line circuit (FIG. 5) is energized to apply a ground signal through contacts CB–1 to energize a relay E (FIG. 4) in the connected access circuit. With the relay E operated, a 60 hertz signal is applied through the contacts CC–2, E–1 and A–1 and a diode 142 to a light 144 in the operator's console correspond to the particular access circuit designating an incoming call. Each of the operator consoles 20A–20D has a separate pushbutton 146 and a separate light 144 for each of the access circuits 30A–30N. In response to the 60-cycle flashing line, an operator depresses the pushbutton 146 to actuate its connected key store circuit 40. The operator select circuit 48 responds to a signal from the key store and enables the particular console and its operator matrix control circuit 50A–50D while inhibiting the other three operator consoles from acting on the same call. However, the key store circuits of the inhibited operator consoles function to store an access request signal for other calls from its corresponding console if the pushbutton is initially depressed during the time the console is inhibited.

A signal is returned from the operator select circuit 48 to the key store to energize a relay LM. A ground is applied through the LM–1 contacts, the pushbutton 146, and the contacts A–2 to energize a relay PB. A ground is then applied through the contacts PB–1 and CO–1 to mark the access circuit mark lead (MK). When a junctor is seized and a link circuit is selected between the access circuit and the junctor, battery is returned via the sleeve lead S to energize the relay CO. At this time, the communication path is completed through the matrices to the junctors 36 and from the junctor through the operator matrix 58. When the relay CO operates, the CO–1 contacts open to remove the mark from the MK lead. The operation of the relay CO also operates the relay CC through the contacts PB–2, E–2 and CO–2. The operation of the relay CC removes the 60-hertz signal lamp 144 and applies a ground through contacts CC–2, E–1 and A–1 and the diode 142 for continually illuminating the lamp 144 indicating that the connection between the operator and the access circuit was completed.

When the operator receives oral information from the calling party concerning the call to be completed, the operator then depresses the pushbutton corresponding to the access circuit 30A–30N servicing the line being called or trunk being requested. At this time, the operator key store circuit again responds to the depressed pushbutton to request access to the control equipment 28 via the operator select circuit 48 so that the operator matrix can also be connected to the second line access circuit. The relay LM in the key store circuit will again be energized and a ground will be applied through the LM–1 contact and the pushbutton designating the particular called access circuit, to energize the called access circuit relay PB. The relay PB marks the MK lead. Simultaneously, the Junctor and link connections were marked and the mark relay operated to apply battery on the called access circuit sleeve leads to operate the relay CO which, in turn, provides a hold path for the called access circuit and removes the mark from its MK lead.

Figure 5:
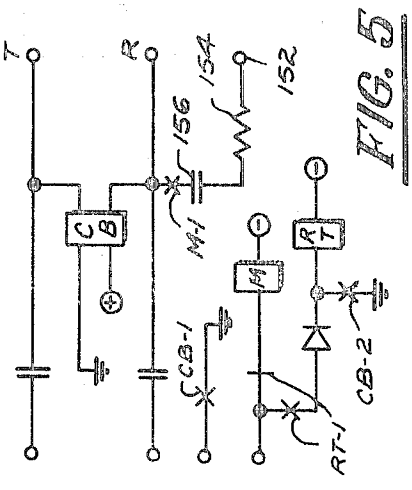
FIG. 5 is a schematic diagram of an example of a line circuit for connection to an access circuit of FIG. 4.

A connection is now made between the calling party, the operator and the called access circuit. In the event the called access circuit is connected to a trunk line, the operator will dial the desired number and the relay PL will transmit the dial pulses to the trunk circuit. In the event the operator is calling another line, a flutter signal (FLU) is applied through the contacts CC–1, CO–3, E–1 and A–1 and the diode 142 to cause the lamp 144 to flutter. At the same time, a ground is applied through the contacts CO–4, PL–1 and RT–1 to energize the M relay (FIG. 5). A ringing signal is now applied from a terminal 152 through a resistor 154, a capacitor 156 and the contacts M–1 to the ring line (R) of the called party. When the called party answers, the relay CB is operated which energizes the relay RT causing the relay M to be deenergized and cut off the ringing signal. A ground is again applied through the CB–1 contacts to energize the E relay. With the relay E operated, a ground is applied through the contacts PB–2, E–2 and CO–2 to operate the relay CC, the operation of the relay CC causes a ground to be applied through the contacts CC–2, E–1, A–1 and diode 142 to the lamp 144 to provide a steady light indicating the connection has been completed. The operator, at the time, depresses an operator release button and is removed from the telephone connection.

In the event one of the parties releases or recalls, its relay CB is deenergized (or momentarily deenergized in the case of recall) to cause the E relay to release. A 120-hertz signal is now applied through the contacts CC–1, CO–3, E–1, A–1 and diode 142 to flash the lamp 144 and alert the operator of the release or recall. The operator will now depress the flashing line button to cause the relay PB to operate which, in turn, extends a ground to the gate 123 through the contacts PB–3 and CO–5 to operate the relay PL. The relay PL, in turn, opens contact PL–1 which removes the ground from the M relay and releases the line circuit.

Figure 4:
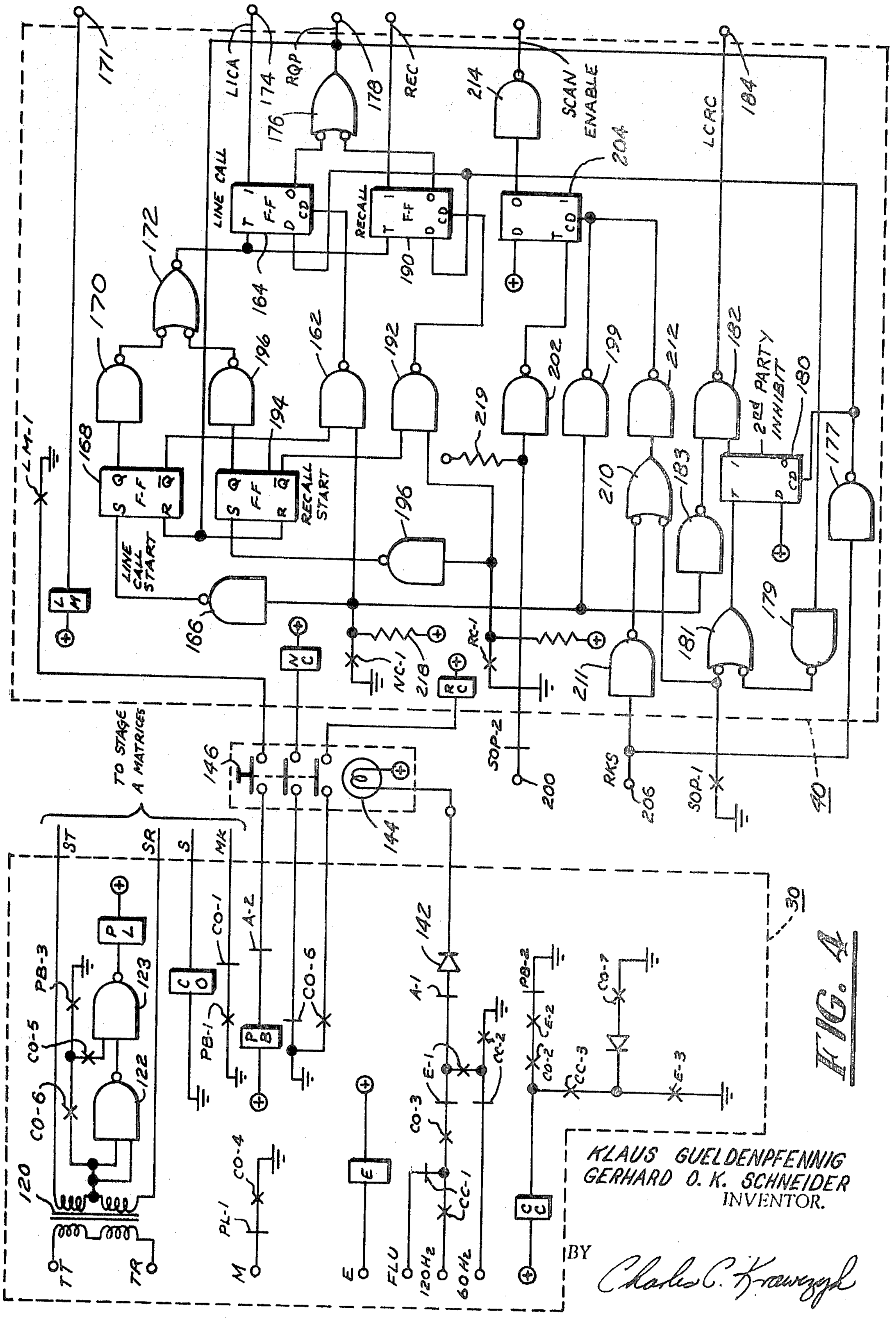
FIG. 4 is a circuit diagram of an access circuit connected via a pushbutton in an operator's console to a key store circuit.

The key store circuit of FIG. 4 (within the dashed block 40) functions to connect the operator to the operator matrix 58, controls line call (new call) and recall requests, enables the junctor scanner decoder 82 and applies operator request signals (RQP) to the operator select circuit 48. When a line call request is received at the operator's console, the pushbutton 146 corresponding to the particular access circuit is depressed and ground is applied through the contacts CO–6 (relay CO is deenergized when a line call is initiated) through the pushbutton to energize relay NC. A ground is applied through the contacts NC–1 to the NAND-gate 162 which applies a high enable signal to the line call flip-flop 164. The ground is also applied through an inverter circuit 166 to set a line call start flip-flop 168. When a line call start flip-flop 168 is set, a signal is applied through an inverter 170 and a NOR-gates 172 to set the line call flip-flop 164.

The line call flip-flop 164 now provides a high signal on the terminal 174 to provide information to the operator select circuit 48 that a line call request (LICA) is being made. The line call flip-flop 164 also applies a signal to a NOR-gate 176 to generate an operator request signal (RQP) on a terminal 178 and also applies a reset signal to the line call start flip-flop 168. The output of the NOR-gate 176 is also connected through an inverter 179 and a NOR-gate 181 to set a second party inhibit flip-flop 180. The output of the second party inhibit flip-flop 180 is applied to NAND-gate 182 and develops a continuous high signal (LCRC) on a terminal 184 as long as the second party inhibit flip-flop 180 is set.

Figure 7:
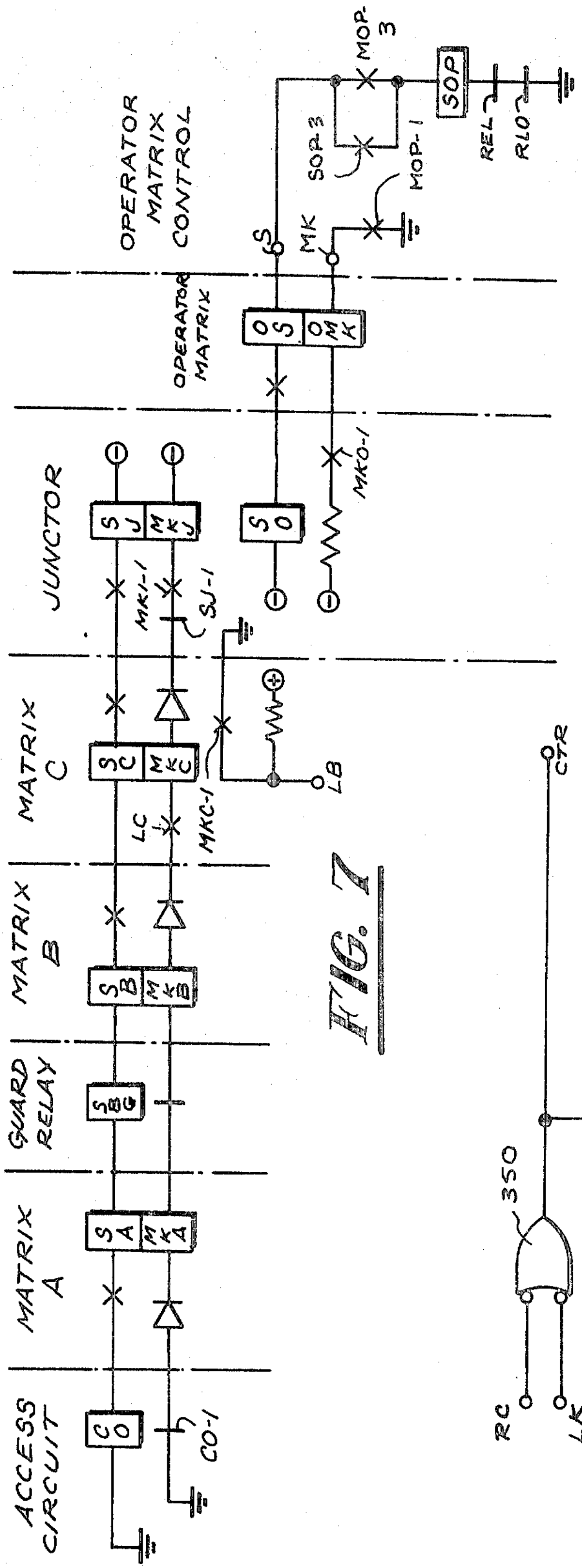
FIG. 7 is a simplified schematic diagram illustrating the mark and sleeve relay circuits for a single mark and sleeve connection from an access circuit through the matrices to a junctor circuit, and a single mark and sleeve connection from the junctor circuit through the operator matrix to the operator matrix control circuit.

A ground is also applied through contact NC–1 and an inverter 199 to enable a junctor scan enable flip-flop 204. The RQP and LICA signals are applied to the operator select circuit 48 which, in turn, applies a LC ground going signal on a terminal 200 (when the operator is to be given access to the common control equipment 28) through contacts SOP–2, an inverter 202 to set the junctor scan enable flip-flop 204. When set, the enable junctor scan flip-flop 204 applies a scan enable signal through an inverter 214 to the junctor decoder 82 (FIG. 2) to initiate junctor scanning. When a junctor is found, the scanner will be stopped via the junctor found circuit 66, the junctor will mark its output to the operator matrix and a sleeve connection will be established to pick up relay SOP (FIG. 7). The contacts SOP–2 (FIG. 4) open and allow the junctor scan flip-flop 204 to be reset. A ground signal is applied through the contacts SOP–1 (FIG.4) and the NOR-gate 181 to reset the second party inhibit flip-flop 180 and maintain the T input high so that the second party inhibit flip-flop cannot cannot be set until the contacts SOP–1 open. With the flip-flop 180 reset, a ground LCRC signal is applied to the terminal 184 which is connected to the junctor logic circuit (FIG. 8) to allow the link check circuit to connect a second party to the seized junctor. With the SOP relay operated, the contacts SOP–2 are opened to allow the junctor scan flip-flop 204 to be reset. The contacts SOP–1 apply a ground signal to a NOR-gate 210 and an inverter 212 to reset the junctor scan enable flip-flop 204 and thereby stop the junctor scan. A terminal 206 is connected to another input of the NOR-gate 210 via an inverter 211 to reset the junctor scan flip-flop 204 by a reset signal RKS from the reset circuit of FIG. 9. The terminal 206 is also connected through an inverter 177 to the reset terminals of flip-flops 164, 180 and 190.

In the event a recall signal is received by the operator console, the relay RC will be operated when the corresponding line pushbutton is depressed (since the relay CO is operated). In such event recall flip-flop 190 is enabled by a signal through a NAND-gate 192 and a recall start flip-flop 194 is set through an inverter circuit 196. When the recall start flip-flop 194 is set through an inverter circuit 196. When the recall start flip-flop 194 is set, a signal is applied through the inverter 196 and the NOR gate 172 to set the recall flip-flop 190. A signal is now applied through the NOR-gate 176 to reset the recall start flip-flop 194 and also through the inverter circuit 179 and the NOR gate 181 to set the second party inhibit flip-flop 180. At this time, the recall flip-flop 190 provides a high-output recall signal (REC) to the operator select circuit 48 to indicate a recall condition. In the case of a recall request, the junctor is already connected and therefore there is no need for a junctor scan enable signal. The junctor scan enable flip-flop 204 is not enabled and is clamped in a reset condition by a high signal through a resistor 219.

When the operator wishes to disconnect, a release button is depressed, the relay SOP is deenergized and a reset signal is applied to the terminal 206. The reset signal resets the junctor scan enable flip-flop 204 (in the case of a release during junctor scanning) and also applies to reset signal to the second party inhibit flip-flop 180, the line call flip-flop 164 and the recall flip-flop 190 and thereby conditions the key store circuit for operation on a next call.

Figure 6:
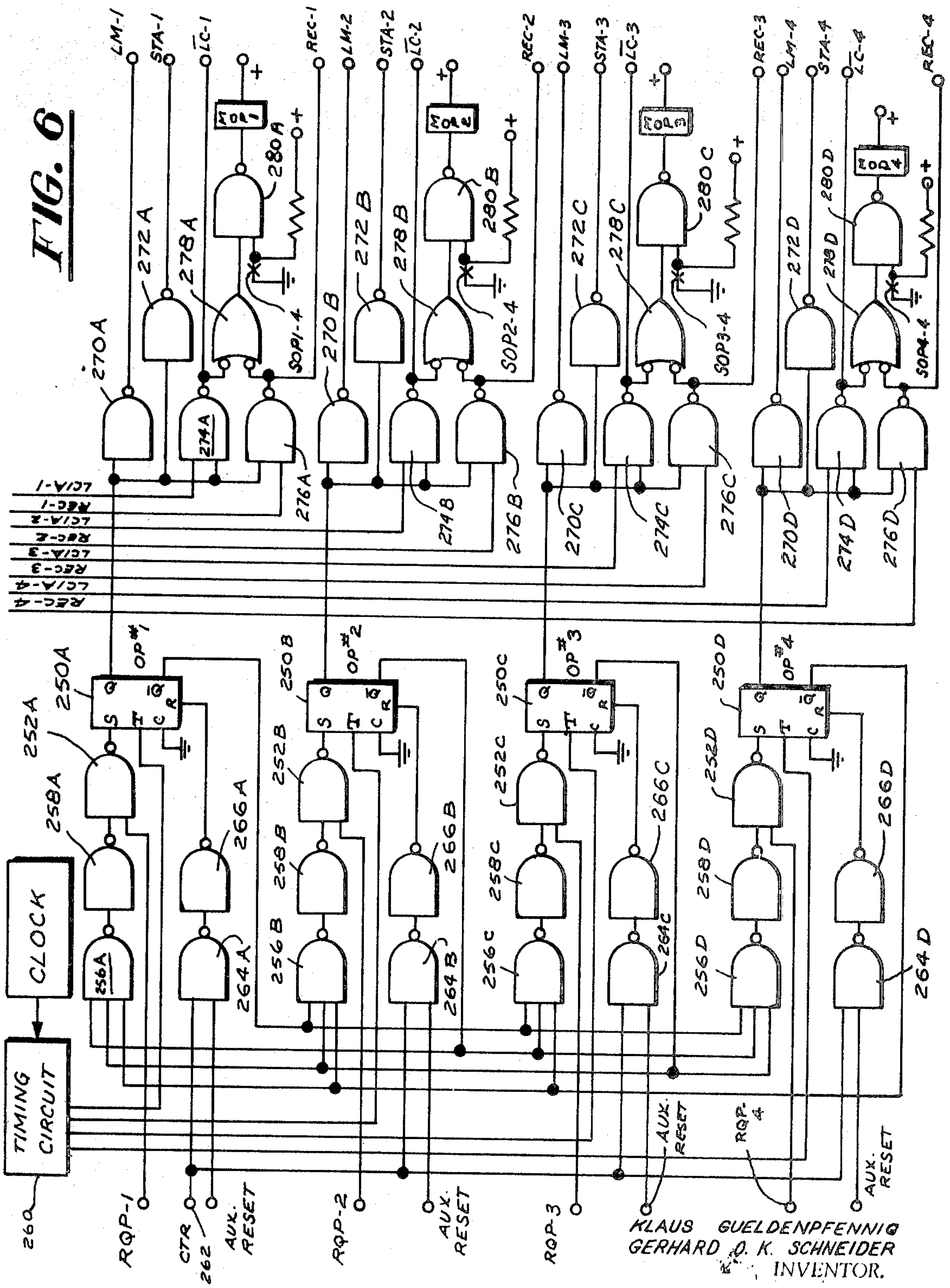
FIG. 6 is a schematic diagram of the operator select circuit.

The operator select circuit of FIG. 6 functions to provide a means by which the control equipment is provided to each operator on a time divided basis in a manner that eliminates the possibility of two or more operators gaining access to the same control equipment at the same time. The operator select circuit includes four identical sets of logic circuits for each operator position. Each set of logic circuits includes a control circuit for granting access to the common control equipment to an operator requesting service and inhibiting other requests until sufficient time has elapsed for a connection to be completed. Each set of logic circuit also include a gating circuit for discriminating between line call and recall requests.

Each operator position control circuit has a separate operator request flip-flop 250A–250D. The set lead of each of the flip-flops 250A–250D is connected to NOR-gates 252–252D, respectively. One input to each of the NOR-gates 252A–252D is connected to separate terminals for receiving the operator request signals (RQP–1 –RQP–4, respectively) from corresponding operator position key store circuits. The $\overline{Q}$ output of the flip-flops 250A–250D are connected through NOR-gates 256A–256D and an inverter circuit 258A–258D in a manner such that the $\overline{Q}$ output of each flip-flop 250A–250D is connected to the NAND gates of the other logic circuits, but not its own.

The T inputs of the flip-flops 150A–250D are connected to separate output circuits of a timing circuit 260 so that the timing circuit sequentially applies trigger pulses to the flip-flops in a continuous rotating sequence. The sequential application of the timing pulses to the flip-flops 250A–250D individually enables the flip-flop in sequence allowing only one flip-flop to be set at a given instant of time. The reset signal CRT from a terminal 262 is applied through the NAND-gates 264–264 D and an inverter circuit 266A–266D, respectively to reset all the flip-flops 250A–250D simultaneously. An auxiliary input connected to another input of the NAND-gates 264—264D for individually resetting the flip-flops 250A–250D.

The Q output of the flip-flop 250A–250D are connected to NAND-gates 270A–270D, 272A–272D, 274A–274D in their respective gating circuit. The other inputs of the NAND-gates 274A–274D are connected to their respective line call request signals (LCIA–1 –LCIA–4) and recall signals (REC–1 –REC–4) terminals from their respective key store circuits (FIG. 4).

For purpose of illustration, assume that operator 1 initiated a request (line or recall) for access to the control equipment. In such event, a high level request signal (RQP–1) from the connected key store circuit is applied to the NAND-gates 256A to apply a high set to the flip-flop 250A. The flip-flop is set on the next trigger pulse from the timing circuit 260. The ground on the C terminal of the flip-flop prevents the flip-flop from being reset by other pulses applied to the T input. During the time that the flip-flop 250A is set, a ground signal is applied to the inputs of the NAND-gates 256B, 256C and 256D which inhibits the setting of the other three operator flip-flops (250B, 250C and 250 D) while the telephone connections are being set up by the control equipment 28. However, in the event one of the other operators that are inhibited during the time the connections are being set up depresses a pushbutton, the request will be stored in the corresponding key store and access till be granted to the operator console when the connections are completed. The connections are completed within 200 milliseconds, so that an operator need merely depress a pushbutton only once to complete a connection, whether or not the particular operator is inhibited when the pushbutton is initially depressed. After the telephone connections are set up, a reset signal CRT appears on the terminal 262 which is transmitted through a NAND-gate 264A and an inverter 266A to reset the flip-flop 250A and thereby removing the inhibit signal on the NAND-gates 256B, 256C and 256D. As can be seen, only a single operator request flip-flop can be set at one time.

The output of each of the NAND-gates 270A–270D are connected to separate relays LM (FIG. 4) in their respective key store circuits. In the above example, with the operator position flip-flop 250A is set, the NAND-gate 270A operates its LM relay to apply a ground through the pushbutton 146 (FIG. 4) to operate the PB relay to provide a mark for the line access circuit. Depending upon whether the operator request signal (RQP) was caused by a line call or a recall request, one of the NAND-gates 274A or 276A will produce either a line call signal (LC–1) or a recall signal (REC–1) The LCIA–1 and REC–1 signals are applied through a NOR-gate 278A and a NAND-gate 280A to operate the MOP–1 relay (provided the SOP relay is not operated). The MOP relay has two functions: it marks the operator matrix with a ground on the MK lead (FIG. 7) and applies a ground to a NAND-gate 282 (FIG. 8) to provide a clamp to prevent the operator release relay REL from operating during the time marking takes place. The relay MOP also provides a contact MOP–3 in the operator matrix sleeve lead S (FIG. 7).

Figure 8:
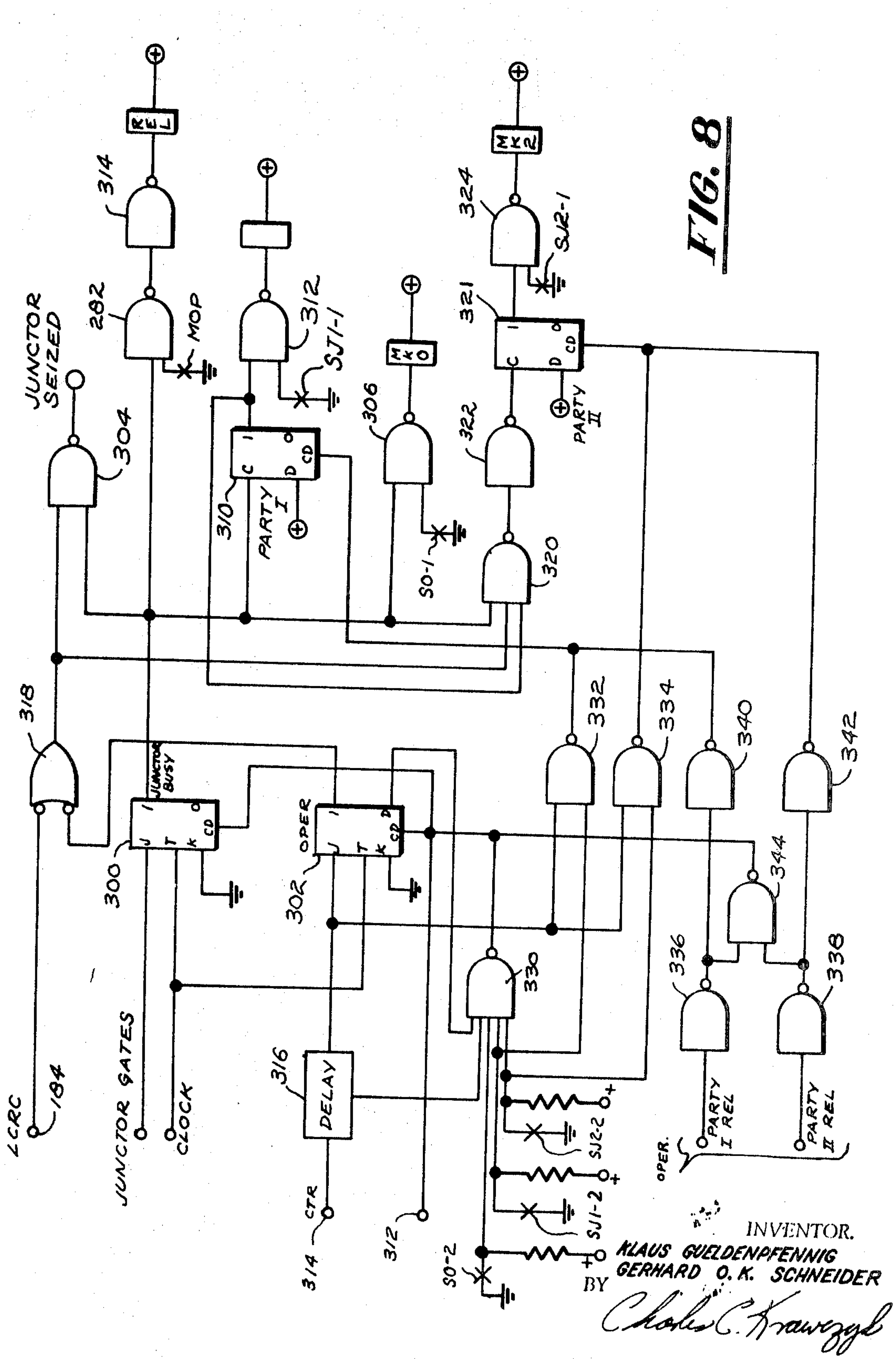
FIG. 8 is a schematic diagram illustrating logic circuitry for the junctor circuits.

Since no central memory is used in this telephone system, each separate junctor circuit includes a logic circuit (as illustrated in FIG. 8) that functions to store the condition of the junctor circuit (busy or free). The logic circuit includes a junctor busy flip-flop circuit 300 and an operator flip-flop circuit 302. As previously mentioned, when an incoming call request is received by the operator, the pushbutton of the corresponding access circuit is depressed, the control equipment is accessed to the operator, and the junctor circuits are scanned for a free junctor. If a junctor circuit is free, both of the flip-flops are in a reset condition. When a junctor circuit is busy, the flip-flops 300 and 302 are set.

When a free junctor circuit is found, a pulse from the junctor scanner (junctor gates 84) sets the junctor busy flip-flop 300 during the presence of a clock pulse. A high signal for the flip-flop 300 is applied to the NAND-gates 304 and 306 and a party I flip-flop 310.

The output of the NAND-gate 304 is connected to the junctor found circuit (FIG. 2) to stop the junctor scanner and also enable one of the link check circuits 90A–90L corresponding to the junctor seized. The high signal applied to the NAND-gate 306 enables the operator mark relay MKO to close the contacts MKO–1 (FIG. 7) to mark the junctor side of operator matrix. The other side of the operator matrix was previously marked by the MOP–1 contacts (FIG. 7) by actuation of a relay MOP (FIG. 6) of the operator in control. The relays SO and OS (FIG. 7) in the operator matrix sleeve circuit now pick up and the SO–1 contacts (FIG. 8) close to apply a ground to NAND-gate 306 and release the MKO relay.

The high signal from the flip-flop 300 (when set) sets the party I flip-flop 310 which, in turn, operates the junctor mark relay MK1 via NAND-gate 312 to close the contact MK–1 (FIG. 7) to mark the particular junctor seized for connection through the Stage A, B and C matrices. As previously mentioned, the link check circuit functions to select a path through the Stage A, B and C matrices between a marked junctor and a marked access circuit. When the mark circuit is completed, the mark line relays MKA, MKB, MKC and MKJ (FIG. 7) pick up and operate the corresponding sleeve relays (CO, SA, SBG, SB, SC and SJ) to complete the holding path. The SJ1–1 contacts now close to release the relay MK–1. After a period of time sufficient for the connections to be completed, a release pulse CRT from the reset circuit (FIG. 9) is applied through a delay circuit 316 (200 milliseconds) to enable the flip-flop 302 to be set by the next clock pulse.

During a first connection set up between the operator and a access circuit, a high LCRC signal is applied via the terminal 184 to the NOR-gate 318. When the operator flip-flop 302 is set, a high signal is applied to the other terminal of the NOR-gate 318 which, in turn, applies a ground to the NAND-gate 304. A high signal is now developed at the output of the NAND-gate 304 which releases the junctor scanner and link check circuit group.

A second pushbutton corresponding to the access circuit being called is now depressed by the operator. A ground LCRC signal via the terminal 184 is applied to the NAND-gate 318 (from the second party inhibit circuit in FIG. 4) which, in turn, causes the output of the NOR-gate 318 to go high thereby causing the NAND-gate 304 to enable the link check circuit corresponding to the junctor previously seized. Since the operator is already connected to the junctor, there is no need to scan for a free junctor.

The input circuits of the NAND-gate 320 are connected to the output circuits of the flip-flop 300, the NOR-gate 318, and the party I flip-flop 310. With the connection between party I and the operator complete, a high signal is now applied to all three inputs of the NAND-gate 320 which sets a party II flip-flop 321 via an inverter 322. The flip-flop 321, in turn, applies a high to a NAND-gate 324 which, in turn, causes the junctor relay MK2 to operate and mark the junctor for connection to the party II access circuit. When the link check circuit finds a free link between the junctor and the party II access circuit, the mark relays pick up and operate sleeve relays. The contacts SJ2–1 close to release the MK2 relay. When the connections between the called access circuit and the junctor are completed, the reset signals RKS (from the reset circuit of FIG. 6) will reset the key store circuit and the LCRC signal will go high to enable the junctor scanner and release the link check circuit.

The operator matrix is released by actuating the RLO relay which opens the sleeve lead of the operator matrix (FIG. 7) releasing the operator from the call. In the event the call is completed or is to be terminated during set up, a signal is developed on the operator reset terminal 312 which resets both the flip-flops 300 and 302 and the junctor circuit is released. If the operator was still connected when the junctor was released, a ground signal from the flip-flop 300 via the NAND-gates 282 and 314 operates the release relay REL to drop out the operator's matrix.

The junctor circuit of FIG. 8 will be automatically reset in the event that party I and party II and the operator are all disconnected. With all the parties and the operator disconnected, a high signal is applied to each of the input circuits of a NAND-gate gate 330. At the next clock input, a reset signal will be applied to the CD terminal of the flip-flops 300 and 302 which, in turn, causes the junctor logic circuit to reset.

A NAND-gate 332 receives input signals from the delay circuit 316 and relay contacts SJ1–2. A NAND-gate 334 is connected to receive input delay circuit 316 and the contacts SJ2–2. In the event that one of the relays SJ1 or SJ2 are deenergized at the time a pulse from the delay circuit 316 is present, the corresponding party I flip-flop 310 or party II flip-flop 320 is reset.

The party I flip-flop 310 and the party II flip-flop 320 can be individually reset by the operator by applying a signal to the NAND-gates 336 and 338, respectively. The NAND-gates 336 and 338 are connected via the inverter circuits 340 and 342 to the party I flip-flop 310 and the party II flip-flop 321, respectively. In the event both parties are to be disconnected, the operator can apply a signal to both the NAND-gates 336 and 338 simultaneously, which will in turn, apply a reset pulse to the flip-flops 300 and 302 via a NAND-gate 344 and simultaneously reset the flip-flops 310 and 321.

Figure 9:
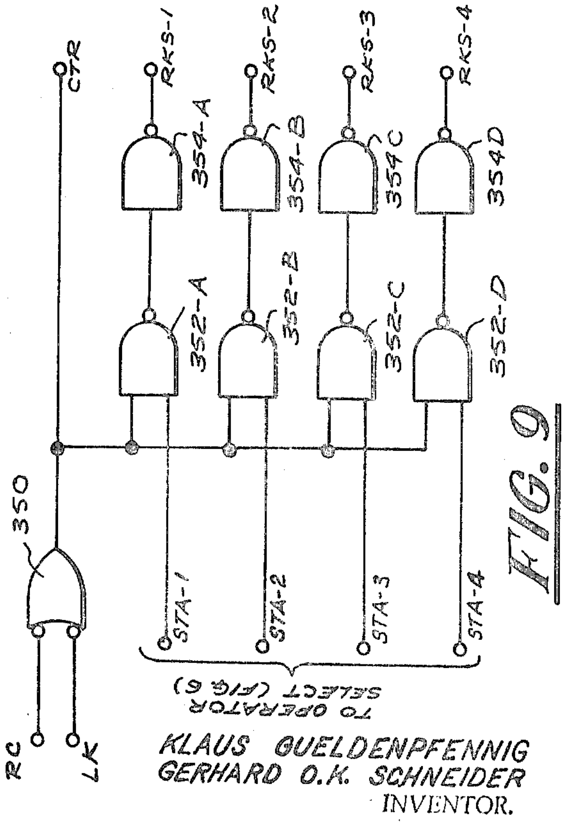
FIG. 9 is a schematic diagram of a portion of a reset circuit for the telephone switching system.

As previously mentioned, if for some reason a call has not been completed within a preset period of time (as for example 200 milliseconds) the reset circuit 70 (FIG. 1) operates to reset all the circuits involved. The circuit diagram of the reset circuit is illustrated in FIG. 9. A signal RC is generated (by a timer circuit not shown) 200 milliseconds after an operator was given access to the control equipment 28 which is applied to a NOR-gate 350 which generates the general reset signal CTR applied to the junctor logic circuit (FIG. 8), and the operator select circuit (FIG. 6). In addition, the reset signal CTR can be generated, if desired, when a connection is completed allowing for more rapid operation. In such a case, the signal from the operator to line connect circuit 72 (receiving a connection complete signal from the junctor circuit 36) can be applied to the LKC input of the NOR-gate 350 to generate the general release signal CTR.

The release signals (RKS) for the individual key store circuits (40A–40D) are provided by individual logic circuits including a NAND-gate 352A–354D connected in series with an inverter circuit 354A–354D, between the output of the NOR-gate 350 and the respective terminals RKS–1–RKS–4. The other input circuit of the NAND-gates 352–352D are connected to the terminals STA–1–STA–4 for receiving signals from and corresponding operator select circuit (FIG. 6). The presence of the STA signal and the CTR signal on any of the NAND-gates 352A–352D provides a reset signal RKS to the corresponding key store circuit to reset the circuit.

The described telephone system requires the operator to be first connected into the network to set up the circuit and later reconnected to disconnect the circuit. This is desirable when the telephone system provides connections between computer interfaces and to radio communication systems, or functions as a semiautomatic patch field. However, with the access circuits connected to telephone set line circuits, wherein the telephone system functions as a private branch exchange, provisions can be included for automatically releasing the access circuits. This can be accomplished simply by connecting a relay contact in series with the sleeve lead S of the access circuit (FIG. 4) that opens the sleeve connector when the relay CB (FIG. 5) is deenergized.

The telephone switching system of the invention provides a means for allowing a plurality of operators to have access to any number of, or all of the incoming and outgoing lines or trunk circuits via common control equipment that is accessible to each of the plurality of operators in a manner so that only one operator can gain access to the control equipment at one time. As previously mentioned, a lamp corresponding to each of the access circuits is located on each of the operator's console. The lamp provides flashing and continuous signals corresponding to various conditions of the access circuit. With an incoming call on an access circuit indicated by a flashing light), any operator can complete the connection by merely depressing the pushbutton corresponding to the access circuit until the lamp shows a connected condition (continuous illumination). During this time, the control equipment 28 was accessed to the operator for automatically connecting the operator to the calling party.

Access to the control equipment 28 is provided on a sequential basis by the clock pulses applied to each of the operator select circuits in sequence (FIG. 6) so that in the event that if more than one operator should depress the button for the same access circuit simultaneously, control will be given to the operator that first receives a clock pulse. The operator select circuit 48 enables the corresponding key store circuit and prevents any other operator from gaining access to the control circuit for a sufficient period of time for the connections between the incoming call and the operator's matrix to be completed. In the event the call is not completed within the present period of time, the reset circuit 70 releases operator that previously gained control and the corresponding lamp of the access circuit will again indicate an incoming call.

When the connection between the operator and the calling party is completed, the control equipment is available for use on other calls by other operators. The calling party will now provide the indication as to the desired connection, i.e., another line circuit or trunk circuit. The operator now merely depresses the button corresponding to the called access circuit and gains access to the control equipment which in turn connects the operator and the calling party to the access circuit.

In the event the connection was to a trunk circuit, the operator will dial the desired connection. If the called party is another line circuit connected to the exchange, ringing is applied to the line circuit. When the called party answers, the light for the called access circuit provides a continuous signal indication that the connections are completed. The operator, the calling party and the called party are all now interconnected. At this time, the operator generally is released from the call.

When a telephone conversation is completed and both parties hang up, the connections through systems can automatically release, or if desired, the operator can be reconnected to release the access circuits. In the event of a recall signal, a light on the operator's console corresponding to the access circuit will flash at a designated rate and the operator will again be connected to the call by depressing the button corresponding to the access circuit. Both parties can be disconnected simultaneously by depressing a two party release button. Either of the two parties can be individually released by depressing individual release buttons.

What is claimed is:

1. A telephone system for interconnecting a plurality of input circuits through a network of switching matrices and junctor circuits comprising:
- control equipment including a junctor scan circuit for seizing free junctor circuits, and a link check circuit for completing free paths through said switching matrices between seized junctor circuits and said input circuits;
- a plurality of operator control consoles, each including control switches for gaining access to said control equipment to make connections between said input circuits and said junctor circuits;
- first circuit means coupled between said operator consoles and said junctor circuits for effecting connection of said operator console to junctor circuits seized by said junctor scan circuit; and
- second circuit means coupled between said operator consoles and said control equipment for accessing said control equipment to an operator console in response to the actuation of a control switch for connecting said operator console to an input circuit, said operator console being accessed to said control equipment for a sufficient period of time to effect connection between said operator console and an input circuit and inhibiting the other ones of said plurality of operator consoles during said period of time.

2. A telephone system as defined in claim 1 wherein:
- each of said plurality of operator consoles includes a separate control switch for each of said input circuits.

3. A telephone system as defined in claim 1 wherein said first circuit means includes a separate matrix for connecting individual ones of said operator consoles to seized junctor circuits.

4. A telephone system as defined in claim 1 wherein said second circuit means includes:
- a separate control circuit for each of said operator consoles responsive to be actuated by said control switches in the respective operator consoles for gaining access to said control equipment;
- circuit means coupled to said control circuit so that when one control circuit is actuated, the other control circuits are inhibited;
- reset circuit means for releasing said control circuits after a preset period of time sufficient to effect connections between said operator and an input circuit; and
- timing means for periodically enabling individual ones of said control circuits in sequence so that only one control circuit can be actuated at any time.

5. A telephone system as defined in claim 4 wherein each of said separate control circuits includes a storage circuit for storing the actuation of a control switch during the period the control circuit is inhibited.

6. A telephone system comprising:
- a switching network including a plurality of switching matrices and a plurality of junctor circuits providing plural paths between input circuits;
- a junctor scan circuit for scanning and seizing free junctor circuits;
- link check circuit means for completing a free path from a seized junctor circuit and a marked input circuit;
- a plurality of operator consoles, each including control switch means for marking input circuits and gaining access to said junctor scan and link check circuits for completing connections between seized junctor circuits and said marked input circuits;
- an operator matrix circuit for each of said operator consoles for effecting connections between said operator consoles and said junctor circuits;
- operator select circuit means connected to each of said consoles for providing access from individual consoles to said junctor scan circuit and to said operator matrix circuit for a preset period of time sufficient to complete connections between said input circuits and console, and inhibiting the other ones of said plurality of consoles during said period of time; and
- release circuit means in each of said consoles for releasing its respective console when connections have been completed between input circuits.

7. A telephone system as defined in claim 6 wherein:
- a separate link check circuit is provided for separate groups of said junctor circuits;
- said operator select circuit means enables said junctor scan circuit when access is provided to a console;
- said junctor scan circuit stops when a free junctor is seized, and
- circuit means is coupled between said junctor scan circuit and said link check circuits for enabling the link check circuit corresponding to the seized junctor circuit.

8. A telephone system as defined in claim 7 including:
- timing circuit means coupled to said operator select circuit means for releasing the operator consoles after said preset period of time.

9. A telephone system as defined in claim 6 including:
- a separate control circuit for each of said operator consoles responsive to be actuated by said control switches in the respective operator consoles for gaining access to said control equipment;
- circuit means coupled to said control circuit so that when one control circuit is actuated, the other control circuits are inhibited;
- reset circuit means for releasing said control circuits after a preset period of time sufficient to effect connections between said operator and an input circuit; and
- timing means for periodically enabling individual ones of said control circuits in sequence so that only one control circuit can be actuated at any time.

10. A telephone system as defined in claim 7 wherein said operator select circuit includes:
- circuit means for distinguishing between a request for a new connection and a request for operator recall to an existing connection;
- circuit means for enabling said junctor scan circuit for requests for new connections; and
- circuit means for enabling a link check circuit corresponding to the junctor circuit to which an operator console is connected, for connecting the console to a second selected input circuit.

11. In a telephone system including a multistage matrix switching network for providing a plurality of circuit paths for connecting input circuits to any one of a plurality of junctor circuits, a plurality of operator consoles having control switches, and control equipment accessible to said operator consoles for completing connections between said consoles and said input circuits via a junctor circuit, the improvement comprising:
- a separate control circuit for each of the operator consoles responsive to be actuated by the control switches in the respective operator consoles for gaining access to the control equipment;
- circuit means coupled to each of said control circuits so that when one control circuit is actuated, the other control circuits are inhibited;
- reset circuit means for releasing said control circuits after a preset period of time sufficient to effect connections between an operator console and an input circuit; and
- timing means for periodically enabling individual ones of said control circuits in sequence so that only one control circuit can be actuated at any time.

12. The improvement as defined in claim 11 wherein:

each of said separate control circuits includes a memory circuit;

each memory circuit is connected to be enabled by its corresponding operator console;

inhibit circuit means interconnects said memory circuits so that when one memory circuit is enabled, the other memory circuits cannot be enabled; and said reset circuit means resets the enabled memory circuit after said preset period of time.

13. The improvement as defined in claim 11 including:

circuit means for distinguishing between a request for a new connection and an operator recall to an existing connection;

circuit means for enabling the control equipment to seize a junctor for requests for new connections; and circuit means for enabling the control equipment to connect an operator to an established connection requesting recall.

14. A semiautomatic patch field comprising:

a plurality of access circuits, a separate access circuit for each of the inputs to said patch field;

a switching network including a plurality of switching matrices providing plural paths for establishing connections between said access circuits;

operator console means including a control switch for each of said access circuits;

control circuit means, responsive to the actuation of separate ones of said control switches, for establishing connections through said matrices between said operator console means and corresponding ones of said access circuits, and for connecting said operator console means to established connections through said matrices between access circuits;

circuit means for disconnecting said operator console means from said switching network while maintaining the established connection between access circuits; and circuit means responsive to switches on said operator console means for disconnecting the established connections between access circuits and between said access circuits and said operator console means, when said operator console means is connected to said access circuits.

15. A semiautomatic patch field as defined in claim 14 wherein:

said operator console means includes a plurality of operator consoles each including a control switch for each of said access circuits;

a separate control circuit for each of said operator console means, each control circuit being responsive to be actuated by said control switches in its respective operator console for gaining access to said control circuit means;

circuit means coupled to said control circuits so that when one control circuit is actuated, the other control circuits are inhibited;

reset circuit means for releasing said control circuits after a preset period of time sufficient to effect connections between said operator consoles and said access circuits; and timing means for periodically enabling individual ones of said control circuits in sequence so that only one control circuit can be actuated at any time.

16. A semiautomatic operator-controlled telephone system comprising:

a switching network including a plurality of switching matrices and junctor circuits for interconnecting a plurality of input circuits;

a plurality of operator consoles, each operator console including a separate control switch for each of the input circuits;

circuit means coupling said control switches to their respective input circuits for marking the input circuit when actuated;

matrix circuit means coupling said plurality of operator consoles to said junctor circuits for connecting said operator consoles to said input circuits;

control circuit means including a junctor scan circuit for seizing free junctor circuits and circuit means for connecting said seized junctor circuit to a marked input circuit;

operator select circuit means for granting access to said control circuit means to an operator console, for a preset period of time, in response to the actuation of a control switch and inhibiting the other ones of said plurality of operators for said period, the arrangement being such that only one operator can gain access to the control equipment at one time;

circuit means coupling said operator select circuit means to said control circuit means so that when an operator console is granted access in response to the actuation of a control switch, the junctor scan circuit and control circuit means are enabled to connect the operator console through the matrix circuit means, a free junctor circuit and the switching matrices to an input circuit, and remain connected after said period of time;

circuit means coupled between said operator select circuit means and said control circuit means so that in response to a subsequent actuation of a control switch at an operator console already connected via a junctor circuit to an input circuit, the operator console is also connected via the same junctor circuit to another input circuit and remains connected after said preset period of time;

circuit means for disconnecting said operator consoles from said junctor circuits while continuing an interconnection between input circuits; and circuit means for disconnecting the interconnection between input circuits.

17. A semiautomatic operator-controlled telephone system as defined in claim 16 wherein said circuit means for disconnecting the interconnection between input circuits requires the operator console to be connected to the junctor circuit serving the two input circuits.

18. A semiautomatic operator-controlled telephone system as defined in claim 17 wherein said operator select circuit means includes:

a separate control circuit for each of said operator consoles responsive to be actuated by said control switches in the respective operator consoles for gaining access to said control circuit means;

circuit means coupled to said control circuits so that when one control circuit is actuated, the other control circuits are inhibited;

reset circuit means for releasing said control circuits after a preset period of time sufficient to effect connections between an operator console and an input circuit; and timing means for periodically enabling individual ones of said control circuits in sequence so that only one control circuit can be actuated at any time.

19. In a telephone system including a multistage matrix switching network for providing a plurality of circuit paths for connecting input circuits to any of a plurality of junctor circuits, a plurality of operator consoles having control switches, and control equipment accessible to said operator consoles for completing connections between said consoles and said input circuits via a junctor circuit, the improvement comprising:

a separate control circuit for each of the operator consoles responsive to be actuated by the control switches in the respective operator consoles for gaining access to control equipment;

circuit means coupled to each of said control circuits so that when one control circuit is actuated, the other control circuits are inhibited;

timing means for periodically enabling individual ones of said control circuits in sequence so that only one control circuit can be actuated at any time; and circuit means for releasing the actuated control circuits after connections between the corresponding operator console and an input circuit are complete.

* * * * *